June 1, 1954 S. C. PETRILLI 2,679,820
CANDY BAR FEEDING MACHINE
Filed Feb. 18, 1952 6 Sheets-Sheet 1
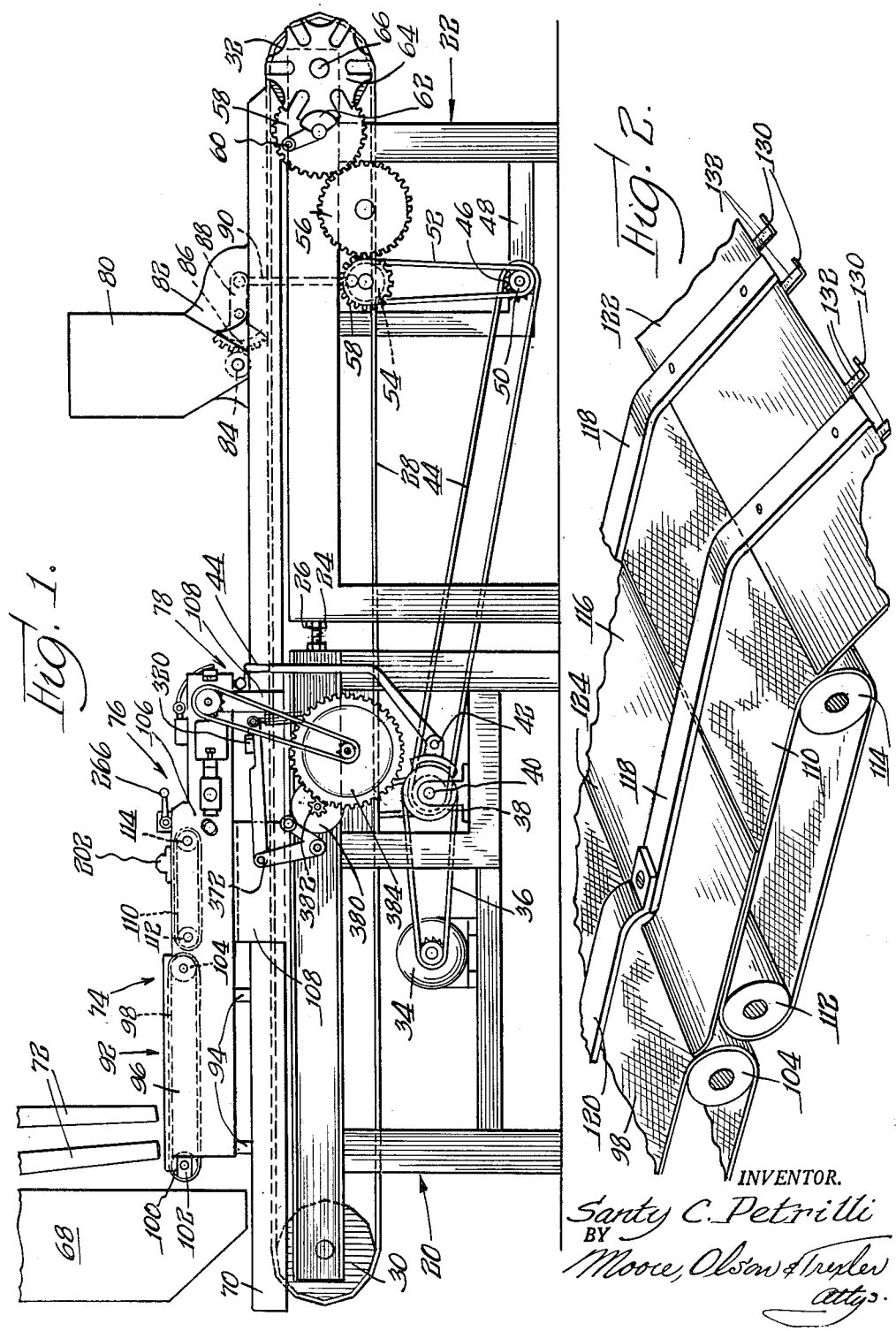
INVENTOR.
Santy C. Petrilli
BY
Moore, Olson & Trexler
Attys.

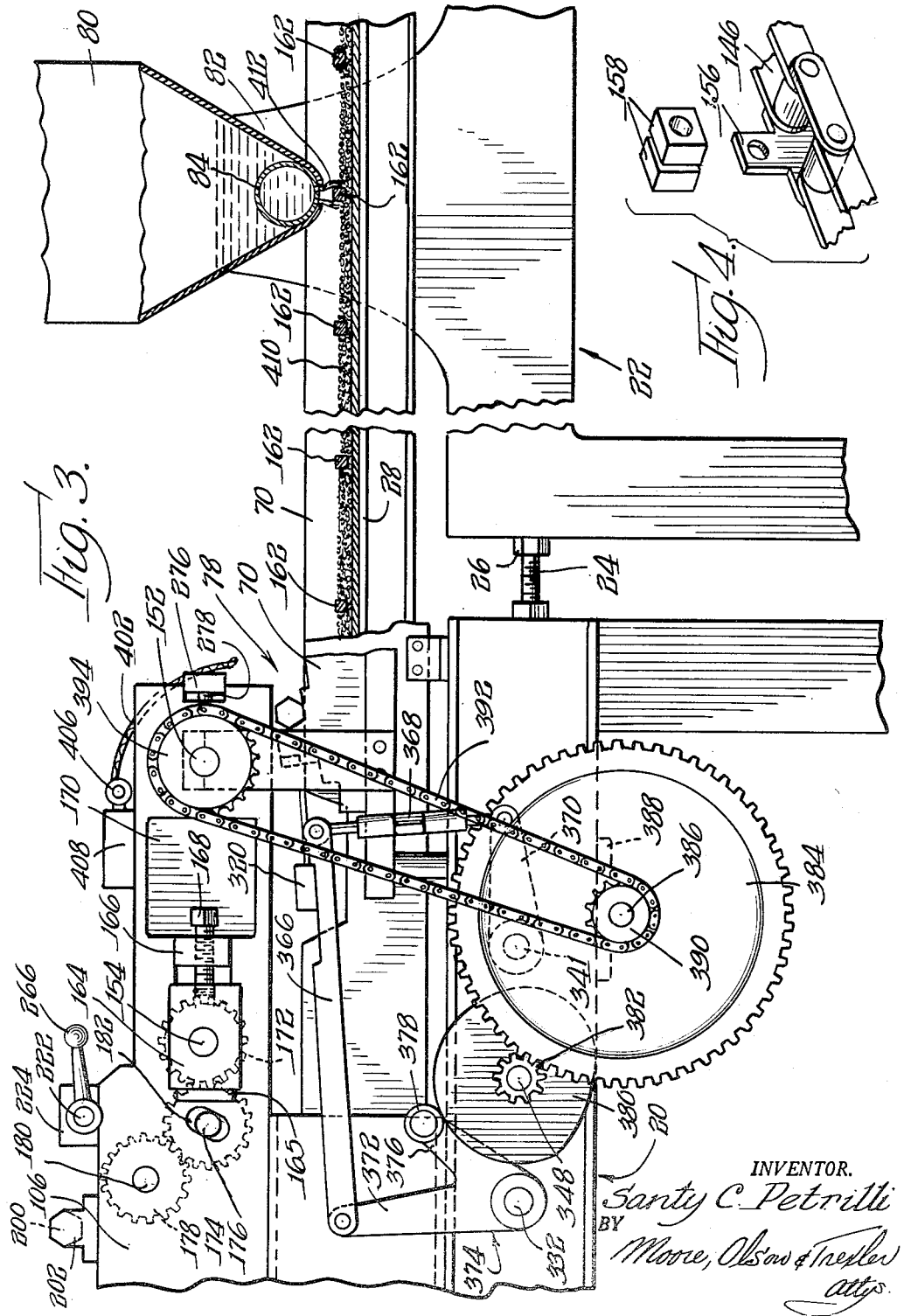

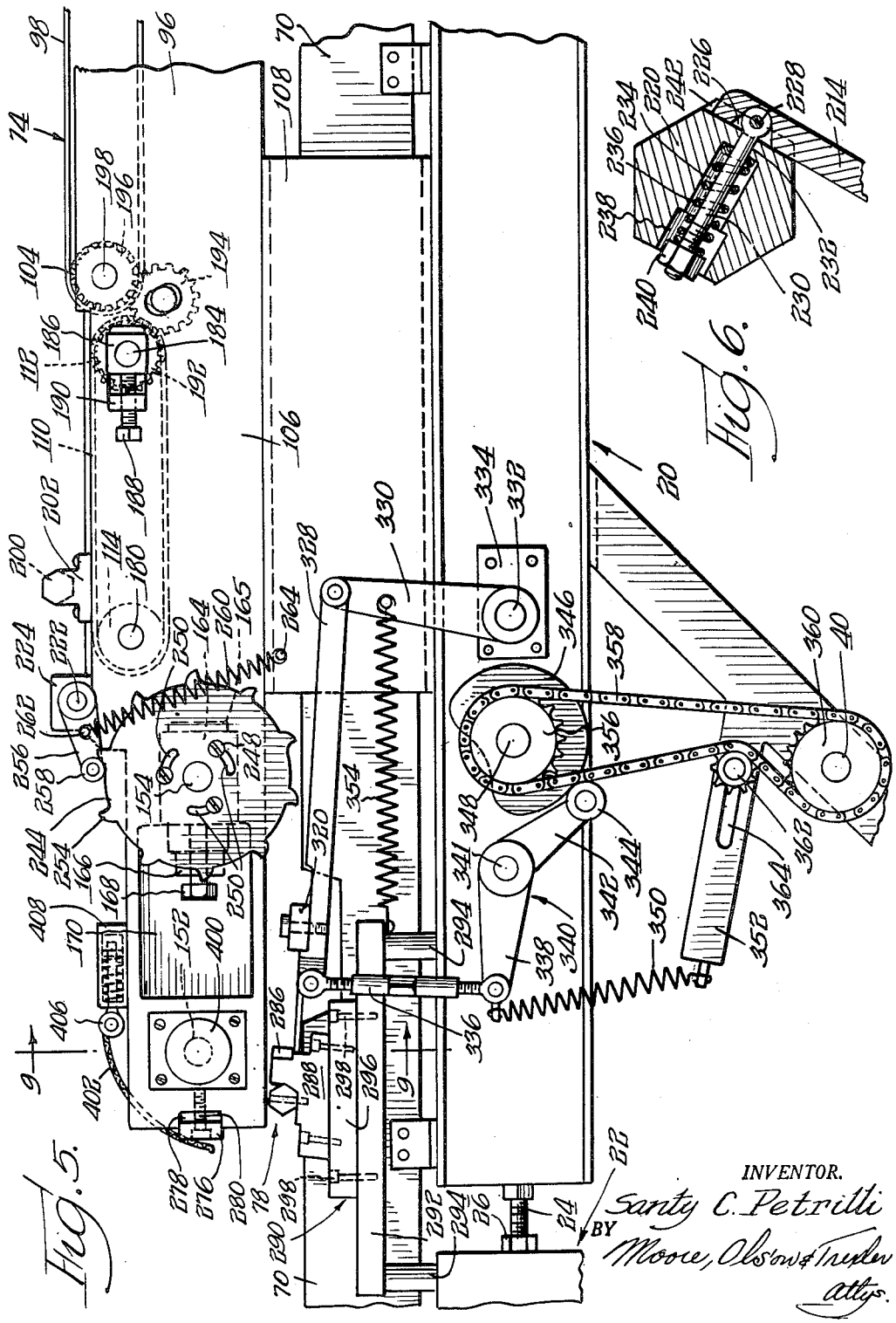

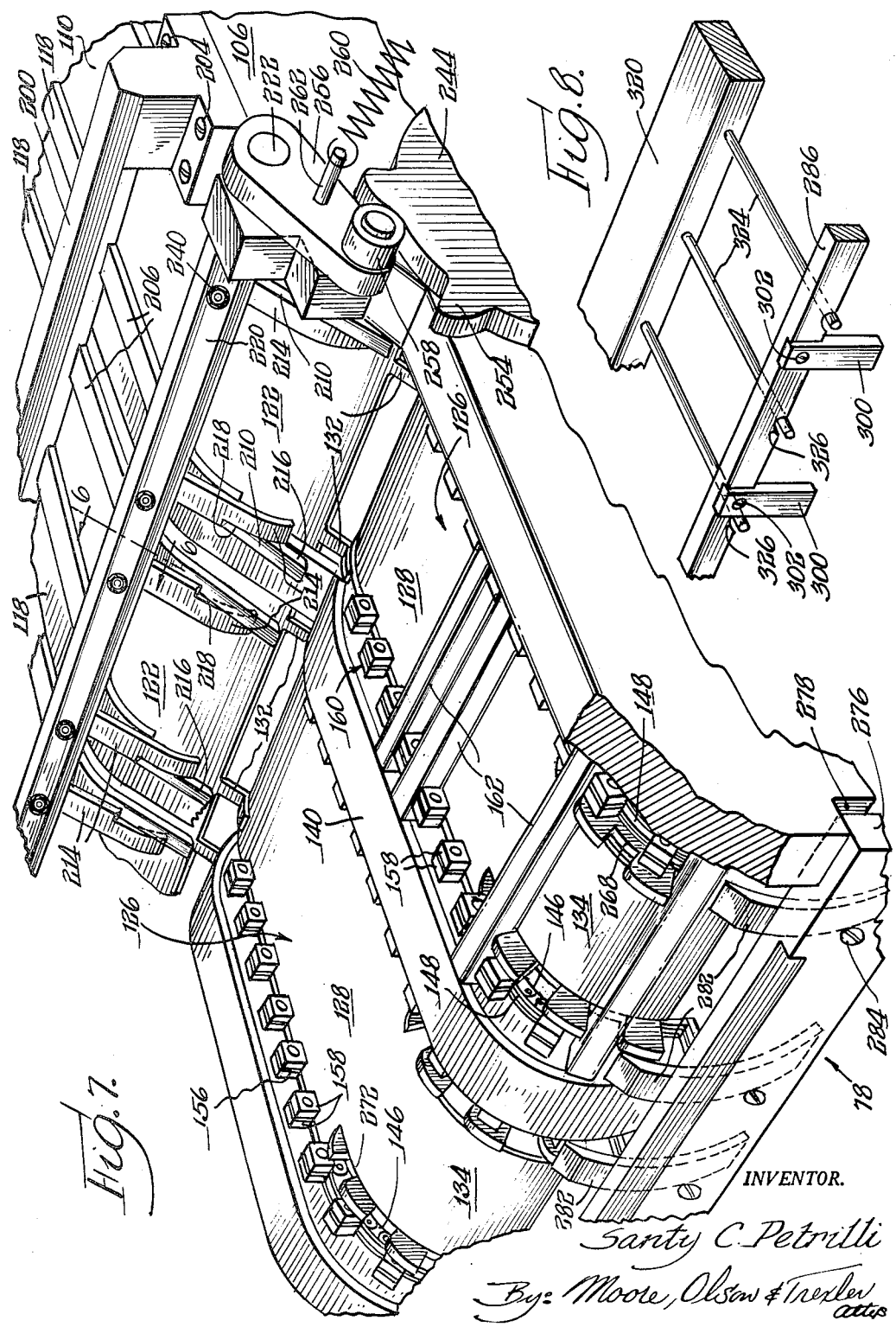

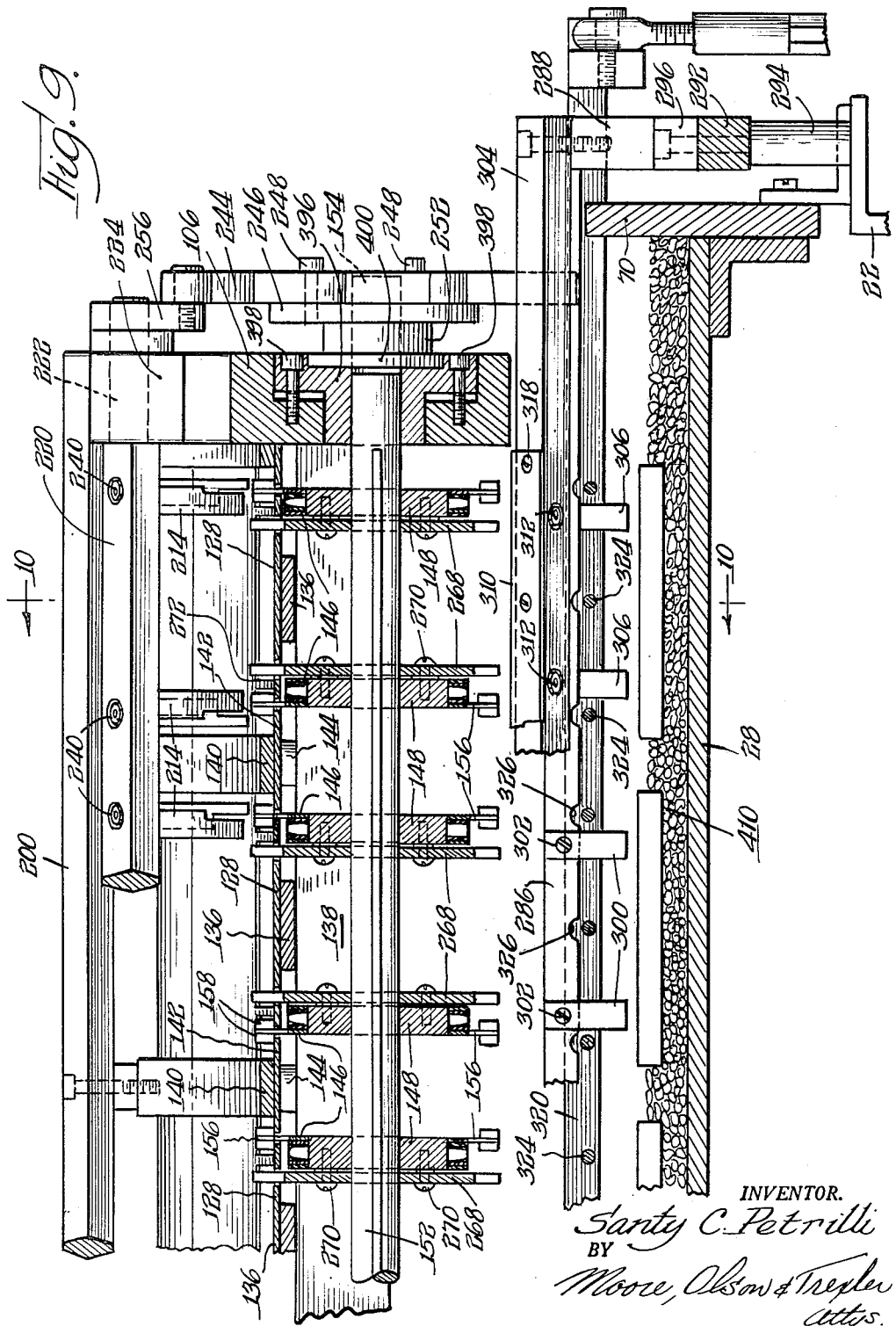

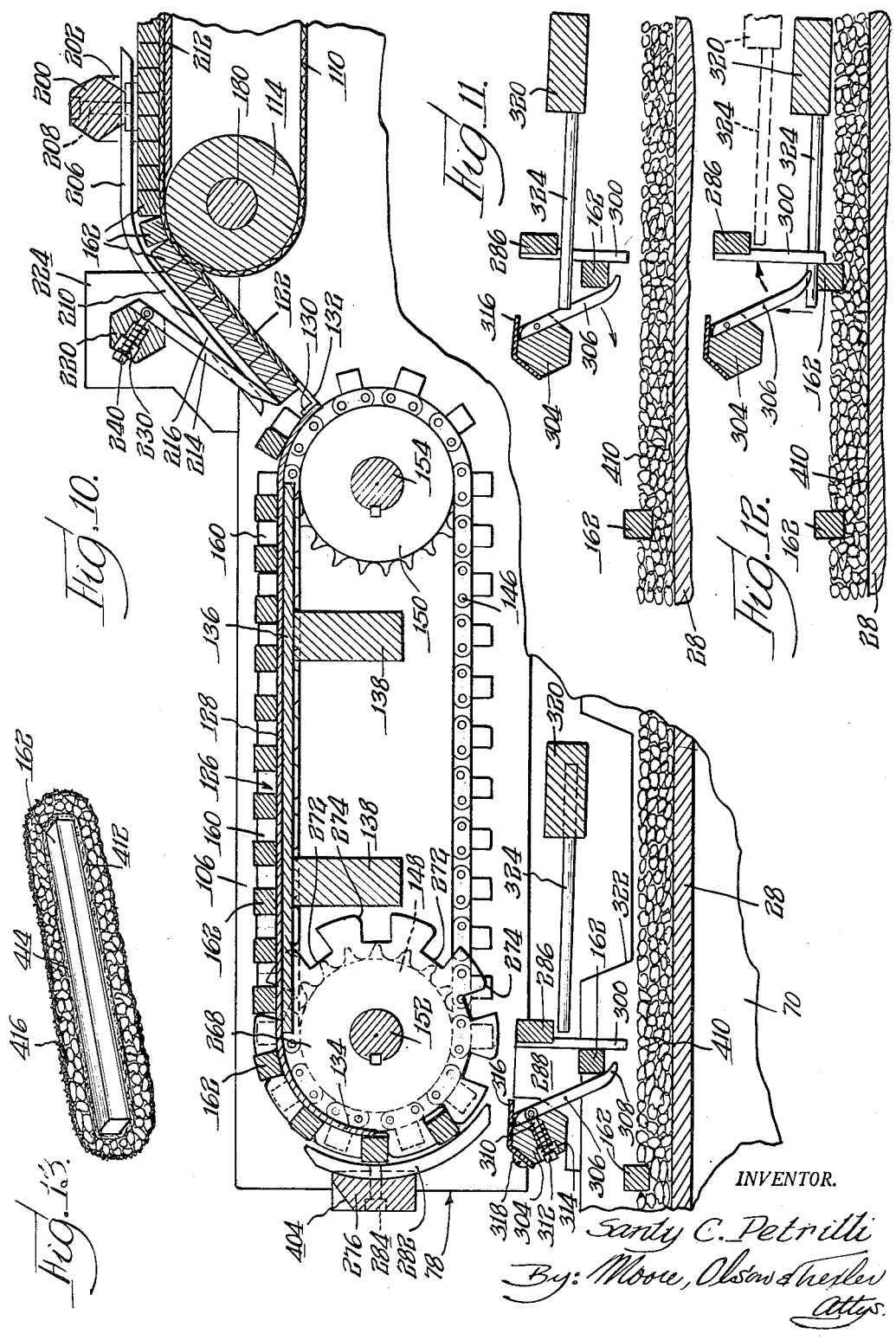

Patented June 1, 1954

2,679,820

UNITED STATES PATENT OFFICE 2,679,820

CANDY BAR FEEDING MACHINE

Santy C. Petrilli, Chicago, Ill., assignor to General Candy Corporation, Chicago, Ill., a corporation of Illinois Application February 18, 1952, Serial No. 272,111

13 Claims. (Cl. 118—30)

This invention is concerned generally with apparatus for feeding candy bar cores and particularly with apparatus for properly spacing and aligning candy bar cores and imbedding the cores in a traveling peanut bed.

Chocolate-covered, peanut-coated candy bars generally include an elongated, central core. This central core is coated with a sticky caramel or other sticky candy coating to cause peanuts to adhere to the core, and the coated core then is rolled or agitated in the presence of peanuts to cause the peanuts to adhere to the core. Subsequently the peanut-coated core is covered with chocolate and after the chocolate is solidified, generally by passing the chocolate-covered bar through a refrigerated compartment, the bar is wrapped and packaged for sale. This invention is concerned primarily with the initial placing of the candy bar cores in proper aligned and spaced relation on and partially imbedding them in a traveling bed of peanuts.

The candy bar cores operated on by the apparatus disclosed in this specification are fragile and readily crushed. Article transfer mechanisms used in other arts are unsatisfactory as the cores may be broken readily and any undue pressure on the cores may cause the cores to stick to the mechanism and particularly to stick to one another if the cores are squeezed together. Furthermore, it is unnecessary and commercially impractical to control the dimensions of the candy bar cores to close tolerances and transfer mechanisms as used in other arts where size is closely controlled are liable to impose strains causing fracture of the bars and jamming of the mechanisms.

An object of this invention is to provide a new or improved apparatus for transferring readily frangible candy bar cores from close contiguous relation into properly spaced and aligned position and partially imbedding the cores in a traveling bed of peanuts.

A more specific object is to provide improved means for facilitating the arrangement of candy cores in aligned, parallel, contacting relation from a random group of cores.

A further object of this invention is to provide improved apparatus for shifting contacting candy bar cores into properly spaced relation, and particularly to provide such apparatus designed to accommodate cores of variant transverse dimensions.

Another object of this invention is to provide a new or improved mechanism for transferring spaced candy bar cores on to a bed of peanuts and partially imbedding the cores in the peanut bed.

A further object of this invention is to provide, in a transfer mechanism as set forth in the last foregoing object, improved means for maintaining the candy bar cores in properly spaced relation during the transfer thereof.

Yet another object of this invention is the provision, in a transfer mechanism as set forth in the penultimate object, of means for moving the candy bar cores substantially vertically on to the bed of peanuts.

A still further object of this invention is to provide a novel driving mechanism imparting a compound motion to mechanism for shifting candy bar cores on to a bed of peanuts and partially imbedding the cores therein.

Other and further objects and advantages of the present invention will be apparent from the following description when taken in connection with the accompanying drawings wherein:

Fig. 1 is a side elevation of a machine embodying the principles of my invention;

Fig. 2 is an enlarged, fragmentary perspective view of the part of the apparatus for bringing the cores into aligned contacting relation;

Fig. 3 is an enlarged side view particularly illustrating a portion of the driving mechanism;

Fig. 4 is an enlarged perspective view of a portion of one of the conveyors;

Fig. 5 is a side view of a portion of the machine taken from the side opposite that shown in Fig. 3;

Fig. 6 is a cross sectional detail view as taken along the line 6—6 of Fig. 7;

Fig. 7 is an enlarged perspective view of the portion of the machine for spacing the candy bar cores;

Fig. 8 is an enlarged perspective view showing a portion of the mechanism for transferring candy bar cores on to the traveling bed of peanuts;

Fig. 9 is a cross sectional view taken substantially along the line 9—9 of Fig. 5;

Fig. 10 is a longitudinal sectional view taken substantially along the line 10—10 of Fig. 9;

Figs. 11 and 12 are views of a portion of the apparatus shown in Fig. 10 and showing the sequential movement of a part of the transfer mechanism, and Fig. 13 is a perspective view of a finished candy bar partially broken away to show the structure thereof.

Referring first to Fig. 1 for a general understanding of the machine, there may be seen a pair of pedestals, tables or supports 20 and 22 maintained in proper spaced apart relation by one or more threaded rods or bolts 24 having one or more jam nuts 26 thereon to be threaded up against the pedestals to prevent accidental variation in the spacing between the pedestals. An endless belt 28 for carrying a bed of peanuts is supported at one end of the table 20 by means of idler wheels 30 and at the opposite end of the table 22 by drive wheels 32. The endless belt 28 is formed of a series of pivotally interconnected steel plates and the drive wheels 32 and idler wheels 30 are of suitable polygonal configuration to cooperate therewith. Suitable supporting means such as idler rollers are provided beneath the upper reach of the belt. It will be understood that the idler drive wheels or rollers 30 and 32 may consist of pairs of spaced apart wheels or may be continuous axially elongated rollers.

A source of motive power shown as an electric motor 34 mounted on a lower portion of the pedestal 20 acts through drive belt 36 to drive a main drive pulley 38 loosely mounted on a main drive shaft 40. A clutch mechanism 42 of substantially conventional construction and including an operating lever or handle 44 is provided to couple the main drive pulley 38 to the shaft 40. The belt 36 is of the link or chain type and the main drive pulley and the pulley on the motor 34 are provided with suitable sprocket teeth thereby to prevent any slippage in the drive mechanism. An endless link belt or chain 44 is driven by a pulley on sprocket shaft 40 and drives a sprocket 46 rotatably carried by a stub shaft on a bracket 48 carried by the pedestal 32. A sprocket pulley 50 fixed to the sprocket 46 drives an endless link belt or chain 52 which in turn drives a sprocket 54 rotatably mounted on the pedestal 22. An idler gear 56 is driven by a gear 58 fixed to the sprocket 54 and drives a gear 58. The gear 58 carries the driving and locking elements 60 and 62 respectively of a Geneva mechanism, the driven member 64 of which is fixed to the shaft 66 carrying the drive wheels 32.

A peanut hopper 68 is provided above the end of the upper reach of the belt 28 adjacent the idler wheels 30 to deposit a bed of peanuts on the upper reach of the belt, the peanuts being retained thereon by side plates 70.

A plurality of downwardly inclined candy bar core chutes 72 terminates immediately above a conveying mechanism 74 whereon the cores deposited from the chutes 72 are manually arranged in aligned, parallel, contacting relation. Further mechanism 76 shortly to be described in detail properly spaces the aligned cores and transfer mechanism 78, also shortly to be described, deposits the cores on, and partially imbeds the cores in, a bed of peanuts on the belt 28.

The candy bar cores are partially imbedded in a bed of peanuts on the belt 28 during the time that the belt is maintained stationary by the Geneva driving mechanism and the candy bar cores then pass on beneath a hopper 80 containing caramel or other sticky or tacky candy. The hopper 80 is supported by a bracket 82 mounted on the table or pedestal 22 and is provided at its lower end with a valve mechanism 84 of the type well known in the art designed to deposit a predetermined quantity of material when rotated through a predetermined number of degrees. The valve mechanism is designed to deposit a plurality of spaced gobs of material rather than a continuous strip. The valve mechanism is rotated through a predetermined arc by a gear segment 86 on one end of a lever 88 pivoted intermediate its ends on the bracket 82 and having a crank arm 90 connected to the end of the lever opposite the gear segment. The other end of the crank arm 90 is pivotally connected to the sprocket 54 at a point spaced from the center thereof. The crank arm is actuated to act through the gear segment 86 to dump gobs of caramel or other sticky or tacky candy material from the hopper 80 when the belt is stopped by the Geneva driving mechanism. At this point it should be mentioned that I have found it convenient to move the belt 28 and bed of peanuts thereof intermittently at a rate of 53 steps per minute, although the rate may be varied somewhat and I do not wish to be restricted to this particular figure.

*The conveying mechanism*

The conveying mechanism 74 is best understood with regards to Figs. 1, 2, 5 and 7 and comprises a framework 92 including legs 94 upstanding from the side plates 70 on the pedestal 20, and side plates 96. An endless conveyor belt 98 passes over an idler roller 100 carried by suitable brackets 102 at the rear of the framework 92 and over a drive roller 104 carried by brackets at the forward end of the framework 92. The drive roller 102 is driven by mechanism hereinafter to be described. Further side plates 106 are supported by upstanding frame members 108 and may be integral with the side plates 96. A second endless conveyor belt 110 is spaced slightly from the belt 98 and the upper reach of the belt 110 is slightly lower than that of the belt 98. The belt 110 passes over an idler roller 112 and a drive roller 114 both of which are carried by the side walls 106, and the drive roller is driven by means hereinafter to be described.

The belts 98 and 110 are made of canvas or the like and are of considerable width relative to the length of a candy bar core. Approximately the leading or receiving half of the upper reach of the belt 110 is covered by a steel plate 116 supported at its lateral edges by the side plates 106 and from above by longitudinal straps 118 (Fig. 2) which serve also as spacers marking the belt 110 and the plate 116 off into a plurality of longitudinal lanes each just slightly wider than the length of a candy bar core. The straps 118 are secured by means such as bolts or screws to the plate 116 and also to longitudinal straps 120 dividing the belt 98 into longitudinal lanes. The straps 120 are supported at their leading ends by means such as a cross bar extending between the side plates 96. The straps 118 and 120 further may be supported adjacent their junctions by a cross bar fitting between the belts 98 and 110 and supported by the side plates 96 and 106. The lower trailing ends of the straps 118 are supported by an inclined plate 122 extending between the side plates 106 and forming a portion of the spacing mechanism 76 as will be apparent hereinafter. The straps 118 are secured to the plate 122 by any satisfactory means including screws.

The forward edge of the plate 116 is positioned almost in contact with the upper reach of the belt 98 as it rounds the drive roller 104, and the leading edge of the plate is curved upwardly as at 124 so as to form a smooth continuation of the upper reach of the belt 98 and leading smoothly into the plate 116.

The candy core chutes 72 are provided with discharge mouths or spouts spaced from one another laterally of the conveying mechanism 74.

Candy bar cores slide endwise down these chutes and drop a very short distance on to the continuously moving conveyor belt 98. As the cores reach the belt 98 they are shifted on to the plate 116 where they readily are arranged manually on the stationary plate in parallel, aligned, contacting relation transversely of the apparatus. There may be any number of lanes marked off by the straps 120 and 118 and I have found 5 or 6 such lanes to be a convenient number, although I do not wish to be restricted to this number. The candy bar cores aligned on the plate 116 readily are shifted by a sweep of the hand on to the belt 110 or will be pushed off the plate and on to the belt by further cores moving on to the plate.

The spacing mechanism

The spacing mechanism is seen best in Figs. 7 and 10 and includes a plurality of parallel conveyors 126 equal in number to the lanes marked off by the straps 118 and aligned with these lanes. Each of the conveyors 126 includes a metal sheet 128 arcuately formed at its leading end and joined to the up turned ends 130 of fingers 132 (Fig. 2) extending from the lower edges of the inclined plates 122. The trailing ends of the plates 128 are down turned through substantially a 90° arc as shown at 134. The plates 128 are supported from below by longitudinal brace bars 136 (Figs. 9 and 10) which in turn are supported by cross braces 138 extending between the side plates 106. The conveyors 128 have their edges defined by the side plates 106 and also by longitudinal straps 140 forming continuations of the straps 118 and supported from below by metal plates 142 of the same type and in the same surface with the plates 128, the plates 142 being supported by spacers 144 on the cross supports 138.

The conveyors 128 further include pairs of sprocket chains 146 (Figs. 7, 9 and 10) spaced apart nearly the distance between adjacent straps 140 and passing over drive sprockets 148 and idler sprockets 150. All of the drive sprockets 148 are keyed on a drive shaft 152 and the idler sprockets 150 are keyed to an idler shaft 154. Every other link on one side of each sprocket chain 146 (this side being the outside of each pair of chains) is provided with an upstanding leg portion 156 (Figs. 4, 7 and 9) having an aperture therein and extending upwardly through the slot between adjacent plates 128 and 142 when on the upper reach of the chain. Square nuts 158 are secured on opposite sides of each upstanding leg 156 by screws or bolts passing through one of the nuts 158 and the aperture in the leg 156 and threaded into the other nut. Each pair of nuts along with its included leg forms a lug or pusher member 160 and the lugs are spaced apart along the chain a distance equal to or just slightly greater than the thickness of the candy bar cores 162 as best seen in Figs. 7 and 10.

The drive shaft 152 is driven by means hereinafter to be described while the idler shaft 154 is driven by the sprocket chains 146. The ends of the idler shaft 154 are journaled in bearing blocks 164 (Figs. 3 and 5) slidably mounted in slots 165 in the side pieces 106. Ears or lugs 166 extend from the side pieces 106 in alignment with the blocks 164 and bolts 168 are threaded through the ears 166 and are received in the blocks 164. The bolts are free for rotation in the blocks 164, but are fixed against axial movement therein by any well known means such as pins in the blocks substantially tangentially fitting in peripheral grooves in the bolts. The outer faces of the end pieces 106 are relieved as at 170 adjacent the bolt heads to provide clearance for a wrench or the like without spacing the bolts outwardly an excessive distance from the side pieces 106. Turning of the bolts one way or the other will adjust the spacing between the drive shaft 152 and idler shaft 154 to maintain the chains taut as will be apparent.

The idler shaft 154 carries a gear 172 (Fig. 3) on one end and this gear meshes with an idler gear 174 rotatably mounted on a stub shaft 176. The idler gear 174 drives a gear 178 on the drive shaft 180 of the drive roller 114 over which the conveyor belt 110 is passed. The stub shaft 176 is adjustably mounted as in a slot 182 and displaced from the line of centers of the gears 172 and 174 to accommodate relative radial movement of these gears upon adjustment of the bolts 168.

Drive shaft 180 is driven by the gears just set forth and acts through the drive roller 114 and belt 110 to drive the idler roller 112. The idler shaft 184 (Fig. 5) is carried by blocks 186 slidably mounted in slots in the side pieces 106 and adjustable by means of bolts 188 threaded through ears 190 in a manner similar to that described heretofore with regard to the shaft 154. The idler shaft 184 is provided with a gear 192 fixed to the end of the shaft on the opposite side of the machine from the gears 172, 174 and 178. The gear 192 acts through a shiftably mounted idler gear 194 to drive a gear 196 on the end of the shaft 198 carrying the drive roller 104 of the conveyor belt 98 to drive this belt. The idler roller 100 of the belt 98 preferably is shiftably mounted to maintain the belt taut, although the specific structure is not shown.

A hexagonal bar 200 (see particularly Figs. 7 and 10) is supported adjacent the discharge or trailing end of the belt 110 by a pair of depending brackets 202 secured on top of the side plates 106 by any suitable means such as screws 204. Flat overlying guide bars 206 are secured to the bar 200 by screws 208 passing through the bar 200 and threaded into the bars 206. The bars 206 are horizontal through a portion of their lengths and are downwardly directed as at 210 so that they are substantially parallel to the upper reach of the belt 110 and downwardly inclined plate 122 throughout their entire lengths. As noted heretofore the upper reaches of the belts 98 and 110 are supported beneath by some suitable means and this means has been illustrated in Fig. 10 as a plate 212, this plate being supported by any suitable means such as cross members extending between the side plates 106.

Candy bar cores 162 advanced from the belt 110 slide down the plate 122, which plate therefore aptly may be termed a slide plate, and are stopped adjacent the lower end thereof short of the lugs 160 by a plurality of fingers 214. The fingers 214, as best seen in Figs. 6, 7, 9 and 10, are arranged in pairs, each pair being spaced apart substantially the width of the lanes defined by the straps 118. The lower ends 216 of the flat bars 206 are relieved at 216 and the lower ends of the fingers 214 are relieved in complementary fashion at 218 to allow the fingers to approach the slide plate 122 to stop candy bar cores thereon while allowing the fingers to be spaced apart nearly the length of a core. The fingers 214 are supported at their upper ends by a hexagonal cross bar 220 having circular ends 222 rotatably received in bearings 224 upstanding from the side plates 106.

Each of the fingers 214 is provided with a groove 226 having a cross pin 228 therein passing through the eye of a bolt 230 pivotally to secure the finger to the bolt. Each bolt passes through a bore 232 in the bar 220 and the bore is enlarged at 234 to accommodate a coil spring 236 encircling the shank of the bolt. The bore 232 further is countersunk at its outer end at 238 to accommodate a nut 240 compressing the spring 236 to cause the bolt to secure the finger 214 in a transverse groove 242 in the bar 220. The pivotal and spring mounting of the fingers 214 allows the fingers to move individually relative to the bar 220 to accommodate candy bar cores of variant transverse dimensions without fracturing the cores or squeezing them so as to cause them to stick to a part of the mechanism.

The idler shaft 154, in addition to gear 172, carries a cam 244 (Figs. 5 and 9) on the end opposite the gear. The cam is loosely mounted on the shaft 154 and is secured to a plate 246 by means of screws or bolts 248 passing through arcuate slots 250 in the cam and threaded into the plate. The plate is provided with an integral hub 252 by means of which it is fixed to the shaft 154. The cam is provided with a plurality of arcuately spaced peripheral actuating lugs or teeth 254 rising in a smooth curve on their leading edges and dropping off sharply on their trailing edges.

An actuating arm 256 (Figs. 5, 7 and 9) is fixed on the outer end 222 of the hexagonal cross bar or rod 220 and carries a cam follower roller 258 at its outer end. A coil spring 260 is stretched between a pin 262 on the arm 256 and a pin 264 on the frame member or support 106 normally to maintain the cam follower roller 258 in contact with the cam. An operating or release handle 266 (Figs. 1 and 3) is provided on the opposite end of the cross bar or rod 220 to allow this cross bar or rod to be rotated manually to retract the fingers 214 from operative position, the fingers remaining retracted when the bar has been rotated sufficiently far to pass the pins 262 and 264 and the bar through a relative dead center position.

*The transfer mechanism*

The conveyors 126 heretofore mentioned as a part of the spacing mechanism 76 also serve at their discharge ends as a part of the transfer mechanism 78. Discs or plates 268 (Figs. 7, 9 and 10) are secured to the drive sprockets 148 by means such as screws 270 and fit in slots 272 in the plates 129 near the discharge ends thereof. The discs or plates 268 are provided with substantially square notches 272 about their peripheries substantially complementary in shape to the cross section of the candy bar cores 162, the leading end of each notch being extended somewhat as at 274 to facilitate entrance of the cores into the notches as the discs rotate. It will be apparent that the spacing between the notches is at all times constant and that the shape of the notches likewise remains constant so as accurately to position the candy bar cores 162 as they pass from the ends of the conveyors 126. The lugs 160, on the other hand, spread apart as they round the drive sprockets 148 and thus do not maintain a constant spacing nor a constant shape of the spacing between them and hence cannot position the cores so accurately as the notched discs 268.

The end of the side plates 106 at the discharge end of the conveyors 126 is provided with a cross bar 276 (see particularly Figs. 5, 7 and 10) fitting in slots 278 and adjustable toward and from the side pieces by means of screws 280. The cross bar 276 serves to hold arcuate shoes 282 in alignment with the sprocket wheels 148 and spaced slightly from the peripheries of the discs 268 to maintain the candy bar cores 162 in the notches 272 as the bars round the end of the conveyor 126. It will be seen in Fig. 10 that the arcuate shoes 282 fit within arcuate grooves in the inner face of the bar 276, the shoes being held in position by means such as screws 284.

Substantially directly beneath the drive shaft 152 there is located a cross bar 286 on brackets 288 upstanding from supports 290 on the pedestals 20 and 22. Each support 290 includes a horizontal beam or bar 292 carried by legs 294 resting on the pedestals 20 and 22. A spacer plate 296 is adjustably mounted on the beam or bar 292 by means such as screws 298 fitting through slots in the spacer and threaded into the bar 292.

The cross bar 286 is provided with a plurality of rigidly mounted depending fingers 300 fitting in grooves or slots in the front face of the bar and secured therein by means such as screws 302. The fingers 300 are very nearly vertical, but have their lower ends displaced just slightly from the upper ends toward the discharge end of the machine.

The brackets 288 further support a hexagonal cross bar 304 having a plurality of fingers 306 carried thereby in alignment with the fixed fingers 300. The lower tips 308 of the fingers 306 are deflected toward the fingers 300 to retain candy bar cores 162 against the fingers 300 as the cores drop off the ends of the arcuate shoes 282. The fingers 306 are secured on the bar 304 by means such as secure the fingers 214 to the bar 220 including bolts 310 fitting in bores in the bar, nuts 312 on the bolts, and springs 314 pressed in the bores by the nuts 312. A plate or roof member 316 is secured to the bar 304 by means such as screws 318 and overlies the tops of the fingers 306 to prevent bits of candy cores or other particles from entering the slots in which the fingers 306 fit in the bar 304.

A shiftable transfer bar 320 fits beneath the side plates 106 and in a relieved portion 322 of the retainer plates 70 and carries a plurality of transfer fingers 324. The transfer fingers 324 fit beneath the shaft cross bar 286 in which clearance is provided by a plurality of scallops 326 (see particularly Figs. 8 and 9) in the lower surface thereof. There are three transfer fingers 324 for each pair of fixed fingers 300, the outer two of each group of three transfer fingers being spaced closely adjacent the outsides of each pair of fixed fingers.

The shiftable bar 320 is supported on the left side of the machine (Fig. 5) by a shiftable strut 328 pivoted at one end to a substantially vertical lever 330. The lever in turn is fixed at its lower end on a shaft 332 carried by a bracket 334 and extending across the pedestal 20. The forward end of the strut 328 is pivotally connected to a substantially vertical turnbuckle 336 the lower end of which is pivoted to one arm 338 of a bell crank lever 340 fixed on a rotatable cross shaft 341 carried by the pedestal 20. The other arm 342 of the bell crank lever is provided with a cam follower roller 344 engaging the periphery of a cam 346 fixed on a shaft 348 journaled in suitable bearings in the pedestal 20. A coil spring 350 is stretched between the extremity of the crank arm 338 and an extending portion 352 on the pedestal 20 to maintain cam follower roller 344 in engagement with the cam 346 and to urge the shiftable cross rod 320 downwardly. Another coil spring 354 is stretched between the substantially vertical lever 330 and the bar 292 supporting the bracket 288 to urge the shiftable cross bar 320 forwardly. A sprocket 356 is fixed on the shaft 348 adjacent the cam 346 and an endless chain 358 is passed over this sprocket and over a sprocket 360 fixed on the main drive shaft 40. The chain 358 is maintained taut by an idler sprocket 362 rotatably mounted on a stud shaft shiftably secured in a slot 364 in the extending portion 352.

The right end of the shiftable cross bar 320 is carried by a substantially horizontal strut 366 (Fig. 3) similar to the strut 328. The forward end of the strut is pivotally connected to a substantially vertical turnbuckle 368 which is pivoted at its lower end to a substantially horizontal lever 370 fixed on the other end of the cross shaft 341. The rear end of the strut 366 is pivotally connected to a substantially vertical arm 372 of a bell crank lever 374 fixed on the other end of the shaft 332. The other arm 376 of the bell crank lever carries a cam roller 378 in contact with the periphery of a cam 380 fixed on the right end of the aforementioned shaft 348. The cam roller is maintained in contact with the cam 380 by the springs 350 and 354 on the other side of the machine acting through the shaft 332.

A pinion 382 is carried by the shaft 348 adjacent the cam 380 and is in driving engagement with a large gear 384 mounted on a shaft 386 carried by a bracket 388 on the under side of the pedestal 20. A small sprocket wheel 390 is mounted on the shaft 386 for rotation with the gear 384 and drives a chain 392. This chain drives a sprocket wheel 394 on the shaft 152 of the driven roller 268 to drive this roller and hence to drive the spacing mechanism and conveying mechanism as set forth heretofore.

The end of the shaft 152 opposite the gear 394 is received in a bearing 396 (Fig. 9) set in the side plate 106 and secured as by screws 398. A cover plate 400 is set into the bearing 396 to keep dirt out of the bearing.

A guard 402 (Figs. 3 and 5) of wire mesh formed into a portion of a cylinder overlies the transfer mechanism 78 and rests against a relieved portion 404 (Fig. 10) of the transverse or cross member 276. The guard 402 is pivotally connected at its upper corners to a pair of members 406 held in mounting blocks 408 on top of the side plates 106. The members 406 are spring urged into the blocks 408 in the position shown in Figs. 3 and 5 and may be withdrawn partially therefrom to facilitate access to the transfer mechanism to clean or repair the mechanism or to clear a jam.

*Operation*

Assuming the motor 34 to be running and the clutch mechanism 42 to be engaged, the Geneva mechanism including the driven member 64 will be rotated through the endless chains and gearing heretofore set forth to drive the belt 28 intermittently at substantially fifty-three intervals a minute substantially as hereinbefore set forth. Peanuts deposited from the peanut hopper 68 form a bed of peanuts 410 (Figs. 3 and 9–12) on the upper reach of the metal belt 28. Simultaneously the conveying mechanism 74 and the spacing mechanism 76 are driven as hereinbefore set forth. Candy cores 162 deposited from the chutes 72 are arranged by an operator in parallel, aligned, contacting relation on the plates 116 and they are pushed from the plates on to the traveling belt 110 directly by the operator or indirectly by the next batch of candy bar cores shifted by the belt with or without the aid of the operator on to the plates 116. Cores shifted by the belt 110 are passed on to the slide plate 120 down which they slide until they are stopped by the fingers 214.

The cam follower roller 258 is lifted periodically by the actuating lugs 254 on the cam 244 to lift the fingers 214 from contact with the candy cores 162 on the slide plate 122. This allows the bottom core in each lane to drop against the upturned lugs 130 on the extending fingers 132 at the bottom edge of the slide plate and between adjacent lugs 160 of the conveyors 126, the timing of the movement of the fingers 214 and the movement of the lugs 160 being such as to allow cores to drop between the lugs. The lowermost core of each lane resting against the conveyor 126 supports the cores above it and the cam roller 258 drops off the actuating lug 254 to allow the spring 260 to return the fingers 214 to stopping position before the cores 162 are moved away by the lugs 160.

The conveyors 126 carrying the cores 162 in spaced relation to the transfer mechanism 78 where they drop one by one from the ends of the shoes 282 to be caught between the fixed fingers 300 and shiftable fingers 306 as shown in Fig. 10. Immediately thereafter, the cam follower roller 378 encounters a proper portion of the cam 380 to allow the spring 354 to shift the shiftable cross bar 320 forwardly and project the ends of the transfer fingers 324 into the space between the fixed fingers 300 and movable fingers 306 and overlying the cores 162 as shown in Fig. 11. The cam follower roller 344 then engages the proper part of the periphery of the cam 346 to allow the spring 350 to shift the cross bar 320 downwardly as shown in Fig. 12, the spring mounted fingers 306 giving way to allow the bars to pass thereby when pushed down by the transfer fingers 324. The timing of the various moving parts is such that the traveling peanut bed 410 momentarily is stopped while the candy bar cores 162 are partially imbedded therein.

The return movement of the transfer bar 320 and transfer fingers 324 under the control of cams 346 and 380 is such as to move the fingers straight up at first and then rearwardly on an arc to the dotted line position shown in Fig. 12 for a succeeding transfer and imbedding operation.

The cores 162 on the traveling peanut bed 410 then move on intermittently and stop directly beneath the caramel hopper 80 where a gob of sticky or tacky caramel or other candy 412 is dropped on them as shown in Fig. 3. The traveling peanut bed with the caramel covered cores then passes on past the end of the belt 28 to other mechanisms forming no part of this invention wherein the caramel coated core is shaken up with the peanuts completely to cover the core and the layer of peanuts 414 (Fig. 13) then is coated with a covering of chocolate 416 to produce the finished bar. Other apparatus then wraps and packages the bars.

The apparatus herein disclosed is particularly adapted for handling relatively fragile candy bar cores. The plate 116 facilitates the original alignment of the bars in parallel, contacting relation and the spring mounted fingers 214 of the spacing mechanism and the spring mounted fingers 306 of the transfer mechanism release the cores with no unnecessary strain. Particularly, these fingers readily accommodate cores of variant diameters such as cannot be done by apparatus in other arts where the articles are held to close tolerances. The notched discs 268 insure proper spacing of the cores as they are dropped between the fixed fingers 300 and the movable fingers 306, and the movement of the transfer fingers 324 is such as to force the cores straight down into the momentarily stationary peanut bed to avoid the imposition of any unnnecessary strains on the cores.

It will be understood that the particular embodiment of my invention that has been shown and described is for illustrative purposes only, and that various structural changes can be made without departing from the spirit and scope of my invention as expressed in the following claims.

I claim:

1. An apparatus for feeding elongated, relatively fragile candy bar cores comprising, a first conveyor for feeding candy bar cores in predetermined spaced relation, means for driving said first conveyor at a constant uniform rate, a second conveyor spaced below said first conveyor and adapted to carry a bed of peanuts, means for driving said second conveyor intermittently in timed relation with the movement of said first conveyor, and means for transferring candy bar cores from said first conveyor to a peanut bed carried by said second conveyor, said transferring means including candy bar core supporting means, a plurality of yieldable fingers spaced from said candy bar core supporting means at least in part a distance less than the transverse dimension of said cores, and means for forcing said cores past said yieldable fingers in timed relation with the movement of said conveyors and for pressing the cores into the peanut bed while said second conveyor is stationary.

2. In a machine for feeding elongated, relatively fragile candy bar cores, a mechanism for transferring such candy bar cores from one location to another, said mechanism comprising aligned, spaced core supporting means, a plurality of yieldable fingers spaced from said core supporting means at least in part a distance less than the transverse dimension of said candy bar cores to engage said cores and arrest movement thereof, a shiftably mounted rake having a plurality of elongated fingers, means for moving said rake fingers longitudinally of said fingers between said spaced core supporting means and said yieldable fingers, and means for thereafter shifting said rake fingers transversely to push cores past said yieldable fingers with a rectilinear motion, said yieldable fingers yielding to permit such movement.

3. In a machine for feeding elongated, relatively fragile candy bar cores, a transfer mechanism comprising a core supporting structure having a plurality of aligned, spaced apart portions, a plurality of yieldable fingers substantially confronting said spaced apart portions and spaced therefrom at least in part a distance less than the transverse dimension of said candy bar cores to arrest movement of said cores, a shiftably mounted rake having a plurality of elongated fingers adapted to fit between said spaced apart portions and said yieldable fingers, cam means for shifting said rake fingers longitudinally, cam means for shifting said fingers transversely, and means for driving said cam means in predetermined timed relation to shift said rake fingers longitudinally between said spaced apart portions and said yieldable fingers and then to shift said rake fingers transversely to force a candy bar core past said yieldable fingers, said yieldable fingers yielding to permit such movement.

4. A machine for feeding elongated, relatively fragile candy bar cores comprising, a first conveyor for feeding candy cores transversely in predetermined spaced relation, means for driving said first conveyor at a uniform constant rate, a second conveyor underlying said first conveyor and adapted to carry a bed of peanuts, means for driving said second conveyor intermittently in timed relation with the movement of said first conveyor, core supporting means positioned between said conveyors and adapted to engage cores passing from the end of said first conveyor, a plurality of yieldable fingers substantially confronting said core supporting means and spaced therefrom at least in part a distance less than the transverse dimension of a candy bar core to arrest movement of said candy bar cores, a shiftably mounted rake adjacent said core supporting means and said yieldable fingers and having a plurality of elongated fingers, means for shifting said rake fingers longitudinally between said yieldable fingers and said core supporting means, and means for shifting said rake fingers transversely to rake candy bar cores past said yieldable fingers and to imbed said cores in a peanut bed carried by said second conveyor while said second conveyor is stationary.

5. A machine for feeding elongated, relatively fragile candy bar cores comprising, a first conveyor for feeding candy cores transversely in predetermined spaced relation, means for driving said first conveyor at a uniform constant rate, a second conveyor underlying said first conveyor and adapted to carry a bed of peanuts, means for driving said second conveyor intermittently in timed relation with the movement of said first conveyor, core supporting means positioned between said conveyors and adapted to engage cores passing from the end of said first conveyor, a plurality of yieldable fingers substantially confronting said core supporting means and spaced therefrom at least in part a distance less than the transverse dimension of a candy bar core to arrest movement of said candy bar cores, a shiftably mounted rake adjacent said core supporting means and said yieldable fingers and having a plurality of elongated fingers, cam means for shifting said rake fingers longitudinally, cam means for shifting said rake fingers transversely, and means for driving said cam means in predetermined timed relation with said conveyors to shift said rake fingers longitudinally between said core supporting means and said yieldable fingers and thereafter to shift said rake fingers transversely to force candy bar cores past said yieldable fingers and to imbed said cores in a peanut bed carried by said second conveyor while said second conveyor is stationary.

6. A machine for feeding elongated, relatively fragile candy bar cores comprising, a first conveyor for feeding candy cores transversely in predetermined spaced relation, means for driving said first conveyor at a uniform constant rate, a second conveyor underlying said first conveyor and adapted to carry a bed of peanuts, means for driving said second conveyor intermittently in timed relation with the movement of said first conveyor, core supporting means positioned between said conveyors and adapted to engage cores passing from the end of said first conveyor, a plurality of yieldable fingers substantially confronting said core supporting means and spaced therefrom at least in part a distance less than the transverse dimension of a candy bar core to arrest movement of said candy bar cores, a shiftably mounted rake adjacent said core supporting means and said yieldable fingers and having a plurality of elongated fingers, first spring means normally urging the rake fingers longitudinally between the core supporting means and the yieldable fingers, a first cam holding said rake fingers back against the action of said first spring means, second spring means normally urging said rake fingers transversely, a second cam holding said rake fingers back against said second means, and means for driving said cams in timed relation with said conveyors to cause said springs to shift said rake fingers longitudinally between said core supporting means and said yieldable fingers and to shift said rake fingers transversely to rake a core past said yieldable fingers and to imbed said core in the peanut bed while said second conveyor is stationary.

7. In a machine for feeding elongated, relatively fragile candy bar cores, the combination comprising a conveyor including a pair of spaced apart endless chains, sets of sprockets supporting and driving said chains, means for driving one of each set of sprockets, a plurality of lugs spaced along each of said chains, said lugs defining candy bar core receiving pockets for feeding said candy bar cores transversely in predetermined spaced relation, and a spacer wheel fixed to at least one of each set of sprockets, said spacer wheels being of larger external diameter than said sprockets and having peripherally spaced notches for maintaining the predetermined spacing between said candy bar cores as said cores pass around the sprockets to which the wheels are attached.

8. In a machine for feeding elongated, relatively fragile candy bar cores, the combination comprising a conveyor including a pair of spaced apart endless chains, sets of sprockets supporting and driving said chains, means for driving one of each set of sprockets, a plurality of lugs spaced along each of said chains, said lugs defining candy bar core receiving pockets for feeding said candy bar cores transversely in predetermined spaced relation, an elongated plate between the upper reaches of each pair of sprocket chains for supporting the candy bar cores as they are fed transversely, and a spacer wheel fixed to at least one of each set of sprockets, said spacer wheels being of larger external diameter than said sprockets and having peripherally spaced notches for maintaining the predetermined spacing between said candy bar cores as said cores pass around the sprockets to which the wheels are attached.

9. A machine for feeding elongated, relatively fragile candy bar cores comprising a conveyor having a plurality of laterally spaced sprocket chains, a plurality of pairs of sprocket wheels supporting and driving said sprocket chains, means for driving one of each pair of sprocket wheels at a uniform constant rate, a plurality of lugs spaced along each of said sprocket chains and defining core receiving pockets for feeding said candy bar cores transversely in predetermined spaced relation, a spacer wheel on one of each pair of sprocket wheels, said spacer wheels being of greater diameter than said sprocket wheels and having a plurality of peripherally spaced notches for maintaining said predetermined spaced relation as said cores round the sprocket wheels to which the spacer wheels are attached, a belt conveyor passing below the chain conveyor adapted to carry a bed of peanuts, means for driving said belt conveyor intermittently in timed relation to the movement of said chain conveyor, a candy bar core support between said conveyors, a plurality of yieldable fingers confronting said support and spaced therefrom at least in part a distance less than the transverse dimension of a candy bar core, said support and yieldable fingers catching cores dropped from said spacer wheels, a rake having a plurality of elongated fingers shiftably mounted adjacent said core support and yieldable fingers, cam means for shifting said rake fingers longitudinally between said core support and said yieldable fingers, cam means for shifting said rake fingers transversely to force cores past said yieldable fingers and to imbed said cores in a bed of peanuts on said belt conveyor, and means for driving said cam means in timed relation with said conveyors to imbed the cores in a bed of peanuts on said belt conveyor while said belt conveyor is stationary.

10. In a machine for feeding elongated, relatively fragile candy bar cores, the combination comprising a first belt conveyor, a second belt conveyor aligned with said first named belt conveyor and having its upper reach spaced slightly below the upper reach of said first named belt conveyor, a stationary plate underlying said second belt conveyor substantially in contact therewith and substantially tangent to said first named belt conveyor for manual arrangement of candy bar cores thereon, a downwardly inclined slide plate substantially tangent to the discharge end of said second belt conveyor, a plurality of escapement fingers overlying said inclined slide plate to arrest movement of candy bar cores thereon, and means for intermittently shifting said fingers away from said slide plate to allow passage of a candy bar core along said slide plate.

11. In a machine for feeding elongated, relatively fragile candy bar cores, the combination comprising means for feeding said candy bar cores continuously at a uniform rate along a predetermined path in predetermined spaced relation, an intermittently operable conveyor, means for alternately driving said conveyor and maintaining said conveyor stationary, means for controlling movement of said candy bar cores from said predetermined path to said intermittently operable conveyor, and means for driving said feeding means, said conveyor, and said controlling means in timed relation to deliver candy bar cores to said conveyor while said conveyor is stationary.

12. In a machine for feeding candy bar cores having means for feeding a plurality of candy bar cores along a predetermined path with groups of candy bar cores arranged transversely of said path, core control mechanism extending across said path and including first core supporting means, shiftable core supporting means confronting said first core supporting means, said first and shiftable core supporting means coacting to engage and arrest each transversely arranged group of candy bar cores, a bar extending across the path of movement of said cores, core engaging means on said bar adapted to extend between said first and shiftable core supporting means, means on one side of said path of movement for shifting said bar transversely in one direction, and means on the other side of said path of movement for shifting said bar transversely in another direction, said last two means effecting a compound motion projecting said core engaging means between said first and shiftable core supporting means to move the cores past the core supporting means.

13. An article spacing mechanism including an inclined guideway, a shiftable support overlying said guideway, a plurality of yieldable fingers carried by said support and adapted to engage and arrest articles sliding down said guideway, a conveyor having a plurality of spaced apart article carrying means adapted to receive said articles from said guideway, and means for driving said conveyor and for shifting said support in timed relation to move said fingers away from said guideway and thereby to release articles one by one into said plurality of article carrying means.

References Cited in the file of this patent

UNITED STATES PATENTS

| Number | Name | Date |
|---|---|---|
| 1,743,227 | Melville | Jan. 14, 1930 |
| 2,260,686 | Segrin | Oct. 28, 1941 |
| 2,335,118 | Hauser et al. | Nov. 23, 1943 |
| 2,551,849 | Petrilli | May 8, 1951 |
| 2,590,051 | Spain | Mar. 18, 1952 |